(12) United States Patent  
Hung et al.

(10) Patent No.: US 8,708,575 B2
(45) Date of Patent: Apr. 29, 2014

(54) ACTIVE OPTICAL CONNECTOR USING AUDIO PORT

(71) Applicant: SAE Magnetics (H.K.) Ltd., Hong Kong (HK)

(72) Inventors: Vincent Wai Hung, Hong Kong (HK); Francis Guillen Gamboa, Hong Kong (HK); Fuk Ming Lam, Hong Kong (HK); Victor Pak Hong Ng, Hong Kong (HK); Dennis Tak Kit Tong, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 51 days.

(21) Appl. No.: 13/674,102

(22) Filed: Nov. 12, 2012

(65) Prior Publication Data

US 2013/0121648 A1 May 16, 2013

Related U.S. Application Data

(60) Provisional application No. 61/558,456, filed on Nov. 11, 2011.

(51) Int. Cl.
*G02B 6/00* (2006.01)
*G02B 6/36* (2006.01)
*G02B 6/42* (2006.01)

(52) U.S. Cl.
USPC ............................. 385/78; 385/88; 385/147

(58) Field of Classification Search
USPC .................... 385/53–75, 88–90, 147
See application file for complete search history.

(56) References Cited

U.S. PATENT DOCUMENTS

| | | | |
|---|---|---|---|
| 6,109,797 | A | 8/2000 | Nagura et al. |
| 6,254,282 | B1 | 7/2001 | Ishihara et al. |
| 6,718,113 | B2 | 4/2004 | Mine et al. |
| 6,887,111 | B2 | 5/2005 | Nakai et al. |
| 6,979,135 | B2 | 12/2005 | Ohe et al. |
| 7,101,089 | B2 | 9/2006 | Sohmura et al. |
| 7,198,504 | B2 | 4/2007 | Chien et al. |
| 2011/0116675 | A1 | 5/2011 | Terlizzi et al. |
| 2011/0116747 | A1 | 5/2011 | Terlizzi et al. |
| 2011/0116750 | A1 | 5/2011 | Terlizzi et al. |

*Primary Examiner* — Akm Enayet Ullah (57) ABSTRACT

An active optical connector using an audio port includes a plug insertable into a jack having an optical transceiver module. A conductor is mounted on the plug. Optical fibers extend through a central bore of the plug and have front ends held in a fiber ferrule. The jack has a terminal for contacting the conductor on the plug. The optical transceiver module has a receptacle for receiving the fiber ferrule. A light source emits light to an optical fiber, and a photo-detector receives light from another optical fiber. A controller chip has a converting circuit configured to convert electrical signals into optical signal and optical signals into electrical signals.

20 Claims, 13 Drawing Sheets

FIG. 13 ns transceiver module may include a receptacle for receiving therein a fiber ferrule that holds first and second front ends of first and second optical fibers received in a central through-hole of the plug, a light source provided on the optical transceiver module for emitting light towards the first front end of the first optical fiber, a photo-detector provided on the optical transceiver module for receiving light from the second front end of the second optical fiber, and a controller chip connected to the light source and the photo-detector, and having a converting circuit configured to convert electrical signals into optical signal and optical signals into electrical signals.

The optical transceiver module may include a light source driver and a photo-detector signal amplifier. The light source can be a light-emitting diode or a laser, and the photo-detector may include a photodiode.

In one embodiment, the jack may further include a spring provided between a rear end of the optical transceiver module and a module holder for absorbing the load from the plug and maintaining a tight connection between the plug and the jack.

The jack may include first and second semi-circular metal contacts for making contact with first and second semi-cylindrical metal contacts provided on the plug respectively. The optical transceiver module may further include a first lens disposed between the light source and the first front end of the first optical fiber along a first optical axis, and a second lens disposed between the photo-detector and the second front end of the second optical fiber along a second optical axis. The receptacle and the first and second lenses can be formed on a lens cover plate disposed perpendicular to the first and second optical axes. The light source, the photo-detector and the controller chip can be mounted on a substrate fixed to the lens cover plate. The optical transceiver module may include a flexible circuit connector connecting the controller chip to a circuit board of an external electronic device.

Although the active optical connector disclosed in the present application is shown and described with respect to certain embodiments, it is obvious that equivalents and modifications will occur to others skilled in the art upon the reading and understanding of the specification. The present application includes all such equivalents and modifications, and is limited only by the scope of the claims.

BRIEF DESCRIPTION OF THE DRAWINGS

Specific embodiments of the active optical connector disclosed in the present application will now be described by way of example with reference to the accompanying drawings wherein.

DETAILED DESCRIPTION

Reference will now be made in detail to a preferred embodiment of the active optical connector disclosed in the present application, examples of which are also provided in the following description. Exemplary embodiments of the active optical connector disclosed in the present application are described in detail, although it will be apparent to those skilled in the relevant art that some features that are not particularly important to an understanding of the active optical connector may not be shown for the sake of clarity.

Furthermore, it should be understood that the active optical connector disclosed in the present application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element, or is in mechanical or electrical communication with another element.

Figure 3:
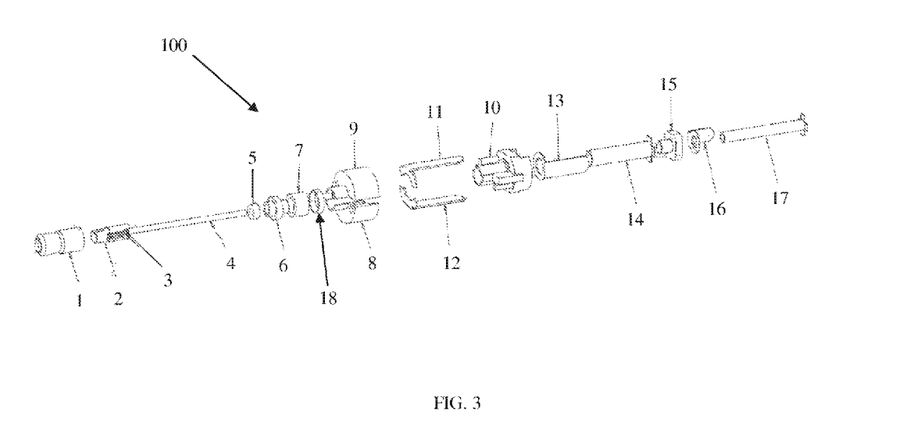
FIG. 3 is an exploded view of the plug.
Figure 4:
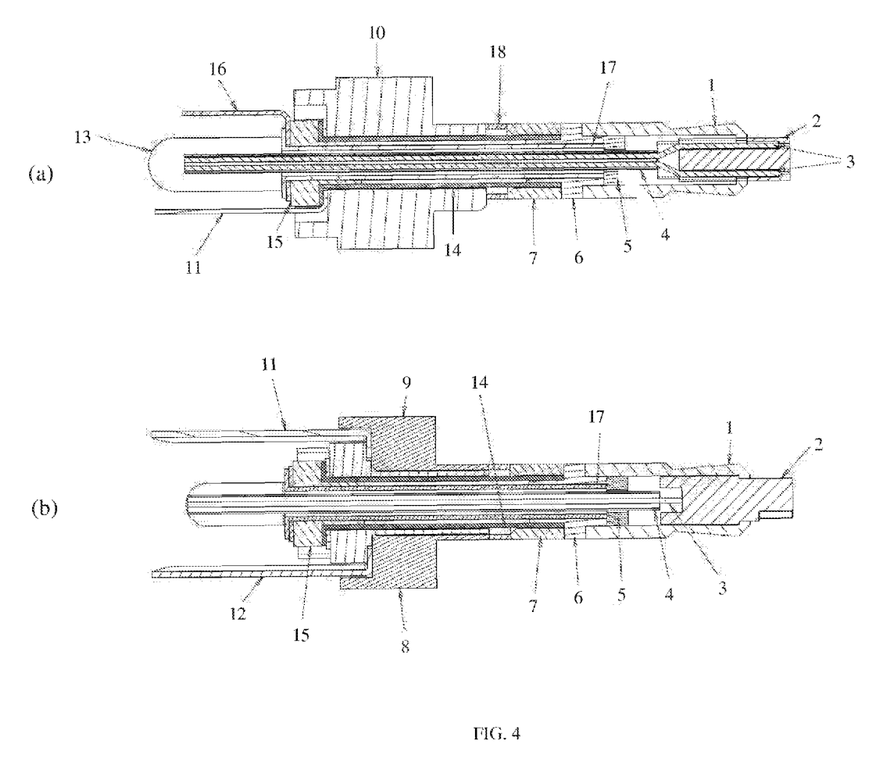
FIG. 4(a) is a longitudinal cross sectional view of the plug.
FIG. 4(b) is another longitudinal cross sectional view of the plug.
Figure 5:
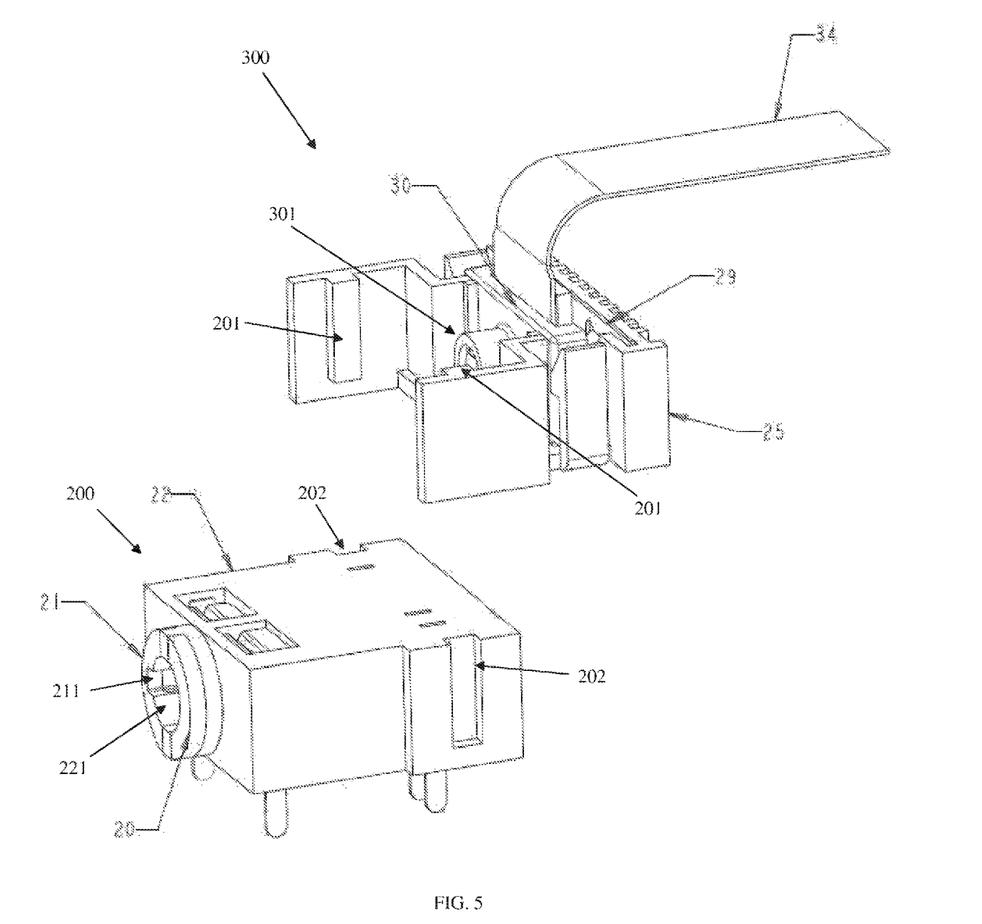
FIG. 5 is a perspective view of a jack and an optical transceiver module according to an embodiment of the present application.
Figure 6:
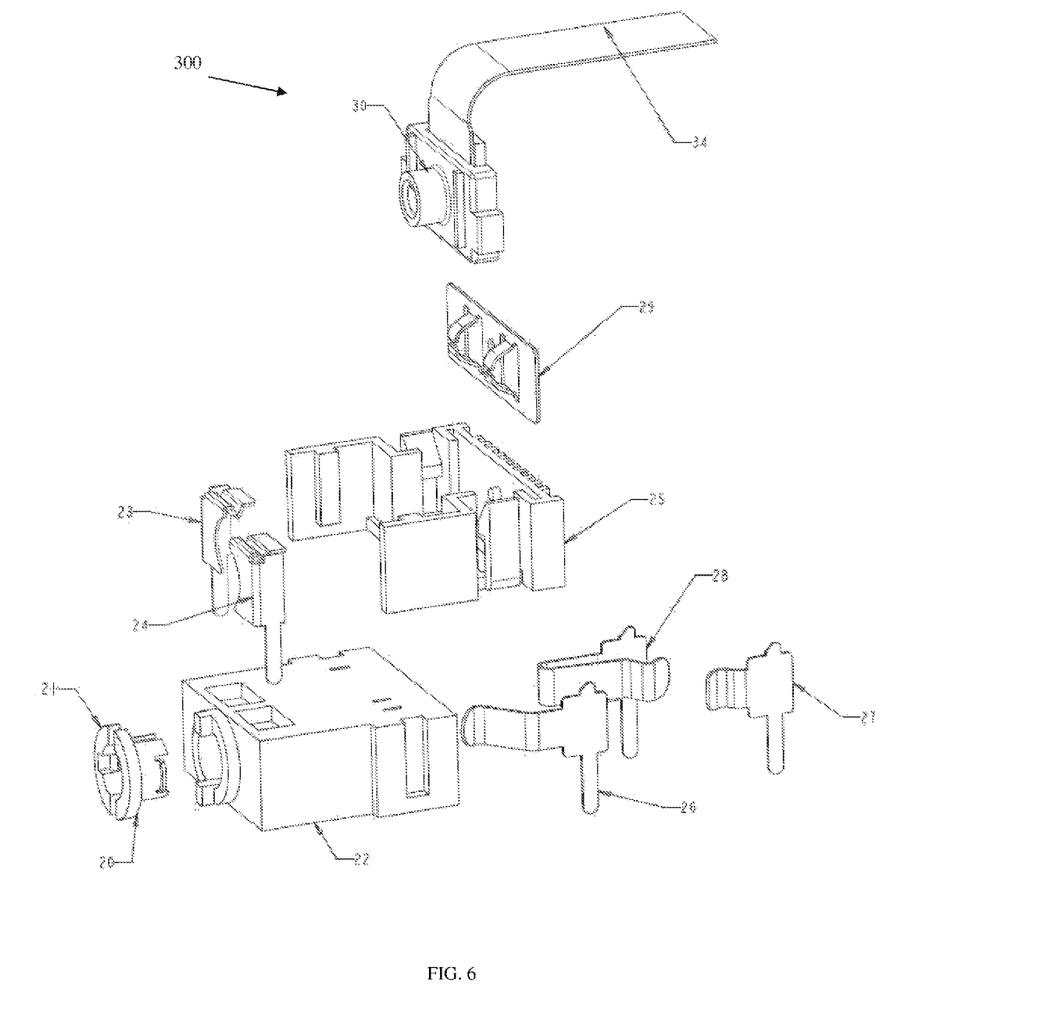
FIG. 6 is an exploded view of the jack and the optical transceiver module of FIG. 5.
Figure 7:
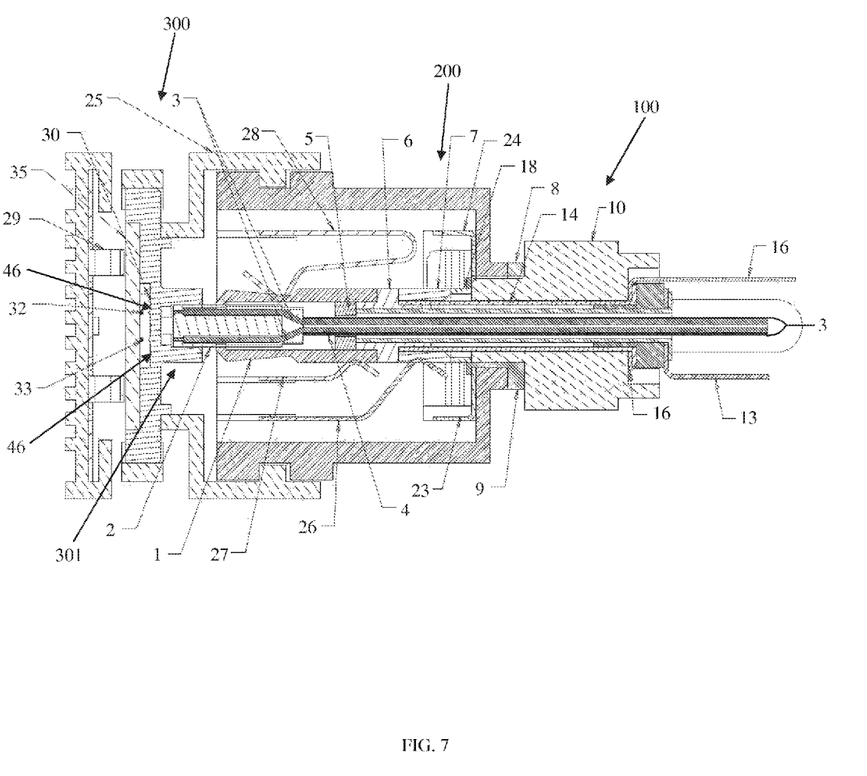
FIG. 7 is a cross sectional view of the jack and the optical transceiver module, and a plug being fully inserted into the jack.

The present application discloses an audio jack-and-plug connector that is compatible with conventional audio port functionality while enabling simultaneous high-speed connectivity through fiber-optic means. The active optical connector using audio port of the present application may include a plug 100 as shown in FIGS. 1-4 and a connector audio jack 200 as shown in FIGS. 5-7. The jack 200 may include a housing 22 with electrical contacts and an optical transceiver module generally designated by reference numeral 300.

The plug 100 may include an elongate body having a longitudinally extending central through-bore. First and second optical fibers 3, as best illustrated in FIG. 4, can extend through the central through-bore for receiving and emitting optical signals respectively therethrough. The first and second optical fibers 3 have first and second front ends respectively held inside a fiber plug or ferrule 2 for insertion into a receptacle 301 in an optical transceiver module 300 when the plug 100 is fully inserted into the jack 200, as depicted in FIG. 7.

The plug 100 may include one or more electrical conductors mounted on the body and configured to make contact with one or more corresponding electrical conductors provided in the jack 200 when the plug 100 is fully inserted therein. The electrical conductors can be used for audio and other digital data transmission.

As depicted in FIGS. 4(a) and 4(b), the plug 100 may include a first conductor having a front metal tip 1 provided at a front portion of the plug 100. A first metal ring 5 can be connected to and mounted within a central through-hole of the front metal tip 1. The front metal tip 1 may also serve as a protective sleeve for the fiber ferrule 2. The fiber ferrule 2 may include precisely positioned through-holes through which the optical fibers 3 can be positioned. The optical fibers 3 can be secured within a protective tube 4 disposed behind the fiber ferrule 2.

The first conductor may further include a first metal tube 17 having a front end and a rear end. The front end of the first metal tube 17 can be connected to the first metal ring 5, and the rear end of the first metal tube 17 can be connected to a first terminal 16.

The plug 100 may include a second conductor having a second metal ring 7 mounted at a middle portion of the plug 100. The second conductor may further include a second metal tube 14 having a front end and a rear end. The front end of the second metal tube 14 can be connected to the second metal ring 7, and the rear end of the second metal tube 14 can be connected to a second terminal 13.

A first insulating ring 6 may be mounted between the first metal ring 5 and the second metal ring 7 for insulation purposes. The first insulating ring 6 may be made of plastic or other suitable material.

The plug 100 may further include a third conductor and a fourth conductor. The third conductor may include a first semi-cylindrical metal member 8 mounted at a rear portion of the plug 100, and a third terminal 12 connected to a rear end of the first semi-cylindrical metal member 8. The fourth conductor may include a second semi-cylindrical metal member 9 mounted at the rear portion of the plug 100, and a fourth terminal 11 connected to a rear end of the second semi-cylindrical metal member 9. The first and second semi-cylindrical metal members 8, 9 form a substantially cylindrical metal member.

A second insulating ring 18 can be mounted between the second metal ring 7 and the substantially cylindrical metal member formed by the first and second semi-cylindrical metal members 8, 9. The second insulating ring 18 may be made of plastic or other suitable material.

The plug 100 may include a plastic separator 15 mounted between one or more first flanges extending radially outwardly from the rear end of the first metal tube 17 and one or more second flanges extending radially outwardly from the rear end of the second metal tube 14. The first terminal 16 and the first metal tube 17 can be heat-stacked to the plastic separator 15 for secure connection.

Figure 1:
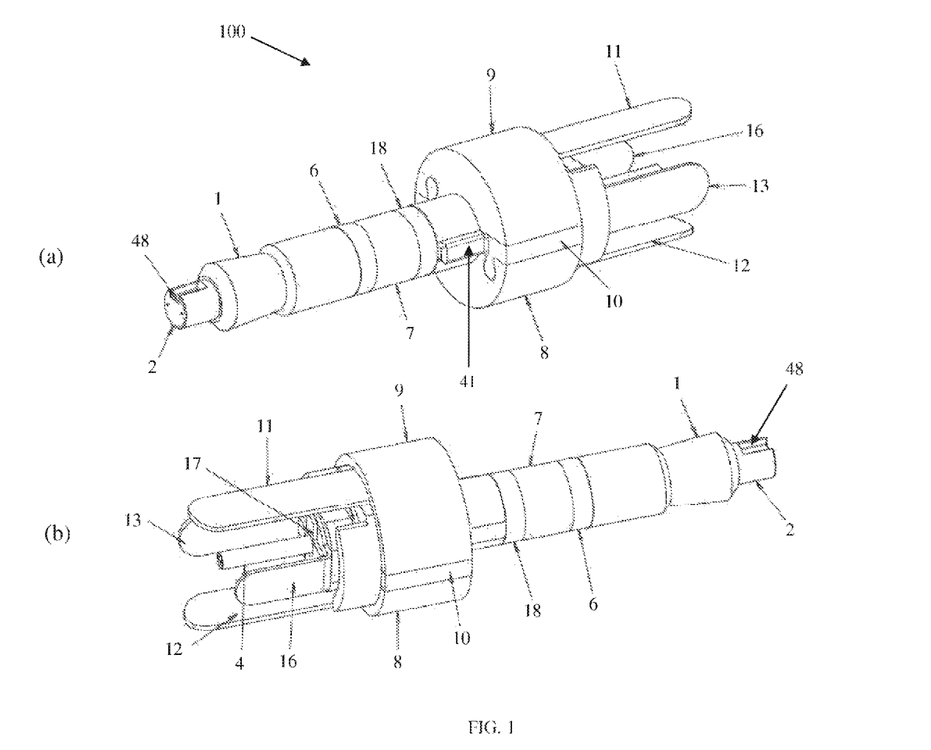
FIG. 1(a) is a front perspective view of a plug according to an embodiment of the present application.
FIG. 1(b) is a rear perspective view of the plug of FIG. 1(a).
Figure 2:
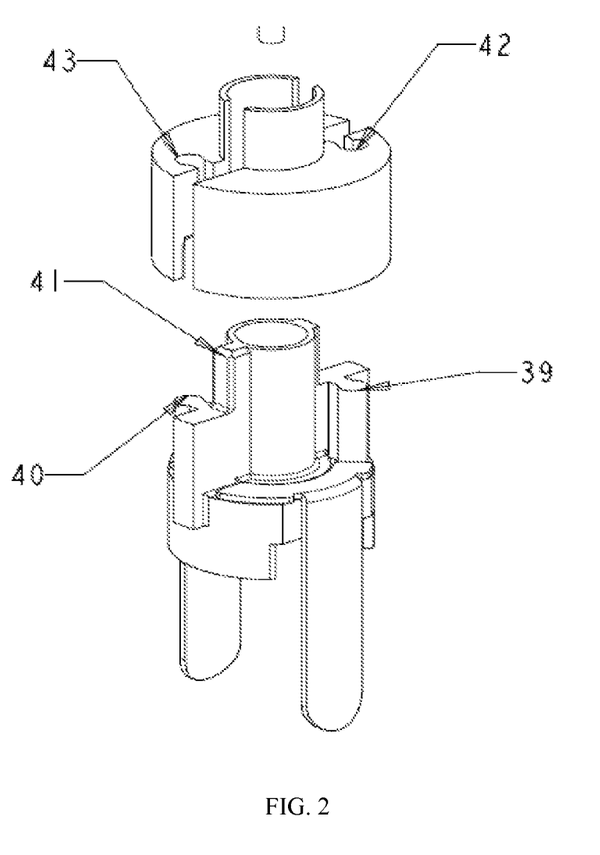
FIG. 2 is an exploded view of a key on the plug according to an embodiment of the present application.

The plug 100 may have an insulating guard 10 mounted between the third and fourth semi-cylindrical metal members 8, 9. As shown in FIG. 2, the insulating guard 10 may include first and second axially extending cylindrical-shaped projections 39, 40 formed on two opposite sides thereof for slidably coupling with first and second axially extending cylindrical-shaped grooves 42, 43 formed on the first and second semi-cylindrical metal members 8, 9 respectively.

Although it has been shown and described that the plug 100 has two optical fibers 3, it is understood by one skilled in the art that the plug 100 may have multiple fibers.

The assembly of the plug 100 can start from the first metal tube 17, the first terminal 16 and the plastic separator 15. The second metal tube 14 can be coupled to the plastic separator 15 followed by the second terminal 13. The insulating guard 10 can then be coupled to the second metal tube 14 on top of the second terminal 13. The third terminal 12 can then be placed at the location provided on the insulating guard 10 and secured by epoxy. The semi-cylindrical metal contacts 8, 9 can then be inserted to location pins and hole-to-hole in place and secured with epoxy. The insulating ring 18 can then be coupled to the second metal tube 14 to separate the second metal ring 7 from the semi-cylindrical metal contacts 8, 9. The second metal ring 7 can be coupled to the second metal tube 14. This can establish connection to the second terminal 13. The insulating ring 6 can then be coupled to the first metal tube 17 to separate the second metal ring 7 from the front metal tip 1. On top of the first metal tube 17, there is a small first metal ring 5 that can maintain connection to the front metal tip 1. The optical fibers 3 and the fiber ferrule 2 can then be inserted through the first metal tube 17. Finally, the front metal tip 1 can then be coupled to the entire assembly.

FIG. 5 is a perspective view of the jack 200 and the optical transceiver module 300 according to an embodiment of the present application, and FIG. 6 is an exploded view thereof. The jack 200 may include a housing 22 having a front opening 221 through which the plug 100 can be inserted.

One or more electrical pins or terminals 23, 24, 26, 27, 28 may be mounted in the housing 22 and configured to make contact with the conductors provided on the plug 100 when the plug 100 is fully inserted in the jack 200.

Two semi-circular metal contacts 20, 21 can be inserted into the front opening 221 of the housing 22, and forced into contact with the terminals 23 and 24 which may be inserted and secured in respective slots formed at a front portion of the housing 22. The terminals 26, 27 and 28 can be inserted and secured in respective slots formed at a rear portion of the housing 22.

The two semi-circular metal contacts 20, 21 are provided for making contact with first and second semi-cylindrical metal members 8, 9 provided on the plug 100 respectively.

The front metal tip 1 can be connected to the terminals 27 and 28 in the jack 200 to form a first electrical connection. The metal ring 7 can be connected to the terminal 26 in the jack 200 to form a second electrical connection. The metal member 8 can be connected to the terminal 24 in the jack 200 to form a third electrical connection. The metal member 9 can be connected to the terminal 23 in the jack 200 to form a fourth electrical connection.

The optical transceiver module 300 can be placed inside the module holder 25. Once inserted, the module holder 25 has a snap feature to secure the optical transceiver module 300 in place. The module holder 25 can have two projections 201 to be coupled to two corresponding channels 202 formed on the housing 22 to secure in pace with the housing 22.

The optical transceiver module 300 can be mounted at a rear open end of the housing 22. The optical transceiver module 300 may include a central receptacle 301 formed on a lens cover plate 30 and having an open end facing the front opening 221 of the housing 22 for receiving therein the fiber ferrule 2 of the plug 100. The central receptacle 301 may be generally cylindrical in shape.

Figure 8:
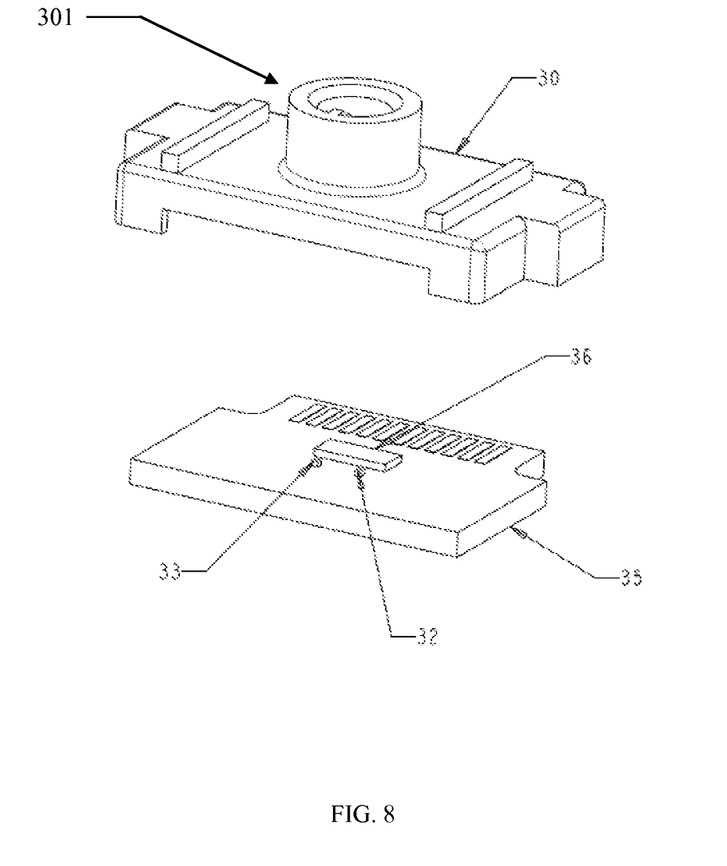
FIG. 8 is an exploded view of a lens cover plate and a substrate according to an embodiment of the present application.
Figure 9:
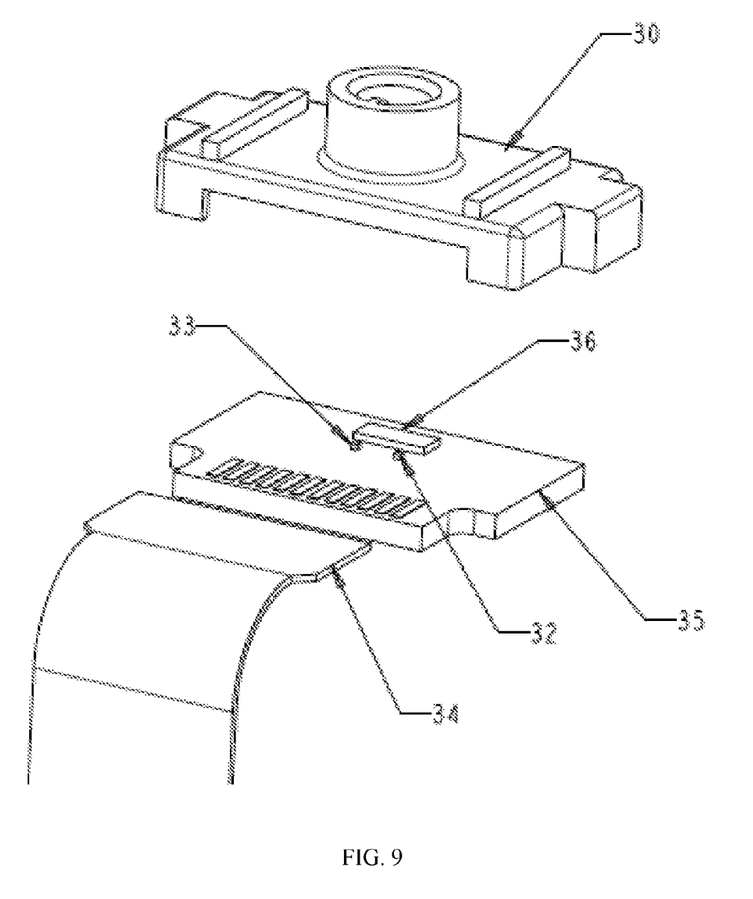
FIG. 9 is an exploded view of the lens cover plate and the substrate of FIG. 8 with a flexible circuit connector.

As depicted in FIGS. 8 and 9, a light emitter or light source 32 can be bonded on a circuit substrate 35 of the optical transceiver module 300 for emitting light towards the first front end of the first optical fiber 3. The light source 32 may be a light-emitting diode, a laser or any other suitable light-emitting device. A photo-detector 33 can also be bonded on the substrate 35 of the optical transceiver module 300 for receiving light emitting from the second front end of the second optical fiber 3. The photo-detector 33 can be a photo-diode or any other possible photo-detector.

A controller chip 36 can also be bonded on the substrate 35. The controller chip 36 can be connected to the light source 32 and the photo-detector 33 by conductive traces formed on the substrate 35. The controller chip 36 may have a converting circuit configured to convert electrical signals into optical signal and optical signals into electrical signals. The controller chip 36 may also combine a light source driver and a photo-detector signal amplifier.

As shown in FIG. 7, a first lens 46 can be formed on the lens cover plate 30 and disposed between the light source 32 and the first front end of the first optical fiber 3 along a first optical axis, and a second lens 46 can be formed on the lens cover plate 30 and disposed between the photo-detector 33 and the second front end of the second optical fiber 3 along a second optical axis. The lens cover plate 30 can be precisely bonded onto the substrate 35 with the optical axis of the lens 46 aligned with the light source 32 and the light sensitive portion of the photo-detector 33.

The receptacle 301 and the first and second lenses 46 can be formed on the lens cover plate 30 disposed perpendicular to the first and second optical axes. The lens cover plate 30 can be used to cover the light source 32, the photo-detector 33 and the controller chip 36 mounted on the substrate 35.

The optical transceiver module 300 can be connected to an external system through different connecting means. For example, a flexible circuit connector 34 can be used to connect between the controller chip 36 and a circuit board of an external electronic device. Contact pads may also be used to couple the controller chip 36 to external board-to-board connectors.

The jack 200 may further include a spring 29 provided between a rear end of the optical transceiver module 300 and a module holder 25 for absorbing the load from the plug 100 as well as maintaining a tight connection between the optical transceiver module 300 and the jack 200.

Figure 10:
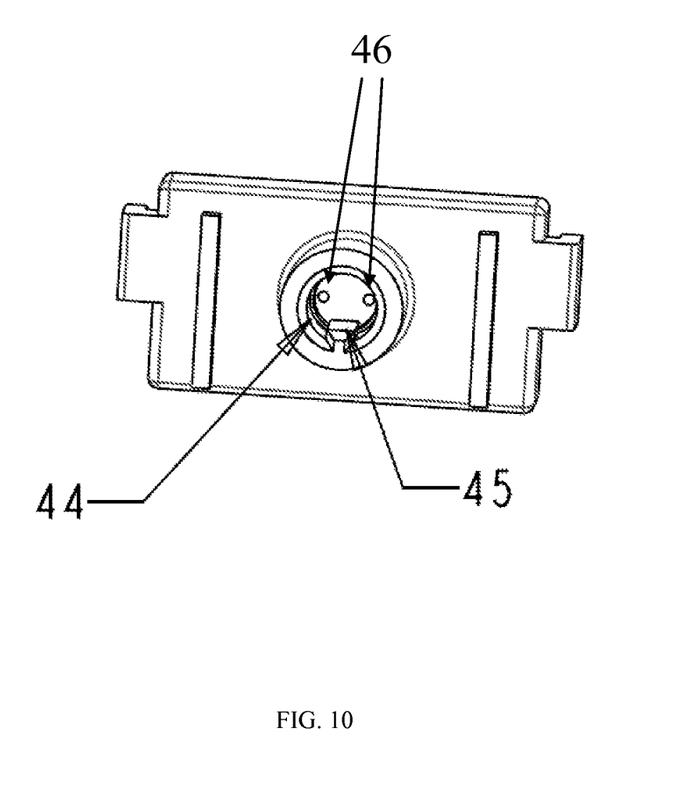
FIG. 10 is a front view of the lens cover plate of FIG. 8.

FIG. 10 is a front view of the lens cover plate 30. When the plug 100 is inserted into the jack 200, the fiber ferrule 2 at the plug 100 is inserted into the receptacle 301 on the lens cover plate 30. To optimize optical signal coupling between the optical transceiver module 300 and the optical fibers 3 embedded in the plug 100, precision alignment features can be provided on both the fiber ferrule 2 and the receptacle 301. An alignment barrel 44 formed on the receptacle 301 can help to secure X and Y alignments between the fiber ferrule 2 and the lens cover plate 30. The key 45, which engages with the keyway 48 on the fiber ferrule 2, can help to prevent tilting and rotation of the plug 100 relative to the jack 200. Once the fiber ferrule 2 is engaged with the receptacle 301, the optical axes of the fibers 3 in the plug 100 can be precisely aligned with the optical axes of the lenses 56 on the lens cover plate 30. In order to help a user to pre-align the key 45 with the keyway 48, the plug 100 may have a key 41 to mate with the keyway 211 formed at the front opening 221 of the housing 22. The design principle is that the key 41 on the plug 100 and the keyway 211 on the housing 22 mates first before the mating of the key 45 and the keyway 48 of the jumper item on the fiber ferrule 2.

Figure 11:
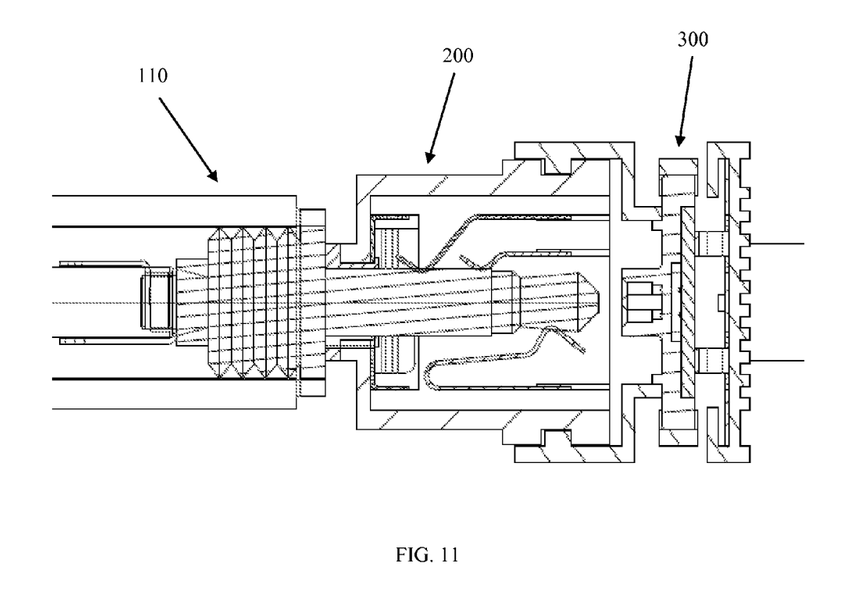
FIG. 11 is a cross section view of a regular audio plug being inserted into the jack.

FIG. 11 is a cross section view of a regular audio plug 110 being inserted into the jack 200 of the present application. It can be seen that the jack 200 of the present application can be used to accept a regular audio plug 110 without optical fibers.

When the regular audio plug 110 is fully inserted into the jack 200, the front metal tip of the regular audio plug 110 is kept at a distance from the receptacle of the optical transceiver module so that it will not make direct contact with the receptacle.

Figure 12:
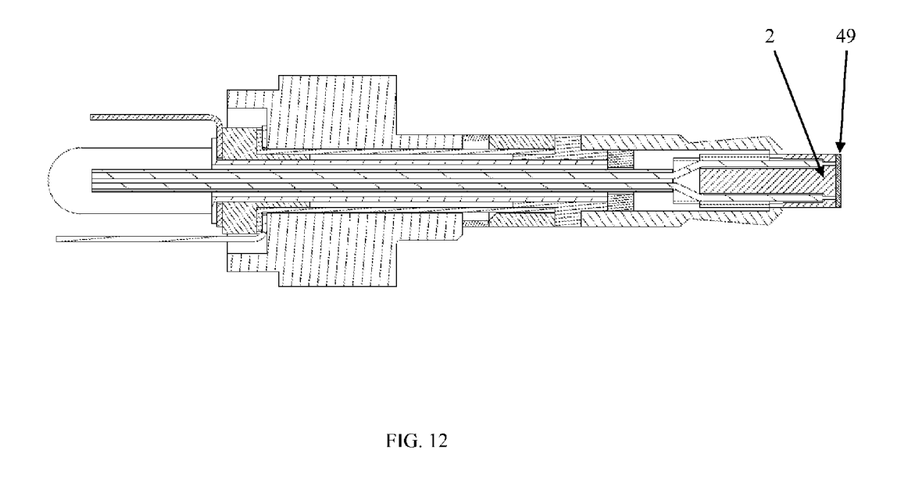
FIG. 12 is a cross section view of the plug of FIG. 1 with a window covering a front face of a fiber ferrule according to an embodiment of the present application.

FIG. 12 is a cross section view of the plug 100 with a window 49 attached to a front face of the fiber ferrule 2 according to an embodiment of the present application. The surface of the window 49 can be resistant to scratching and can act as a protective layer for the optical fibers 3 against physical damage. This window 49 can allow optical signals to pass between the optical fibers 3 and the optical transceiver module 300 without severe attenuation. Optionally, the window 49 may function as an optical filter allowing optical wavelength generated by the light source 32 in the optical transceiver module 300 to pass through while blocking other wavelengths.

Although it has been shown and described that the receptacle 301 and the fiber ferrule 2 are generally cylindrical in shape, it is understood that the receptacle and the fiber ferrule 2 can be in any other appropriate shape.

Figure 13:
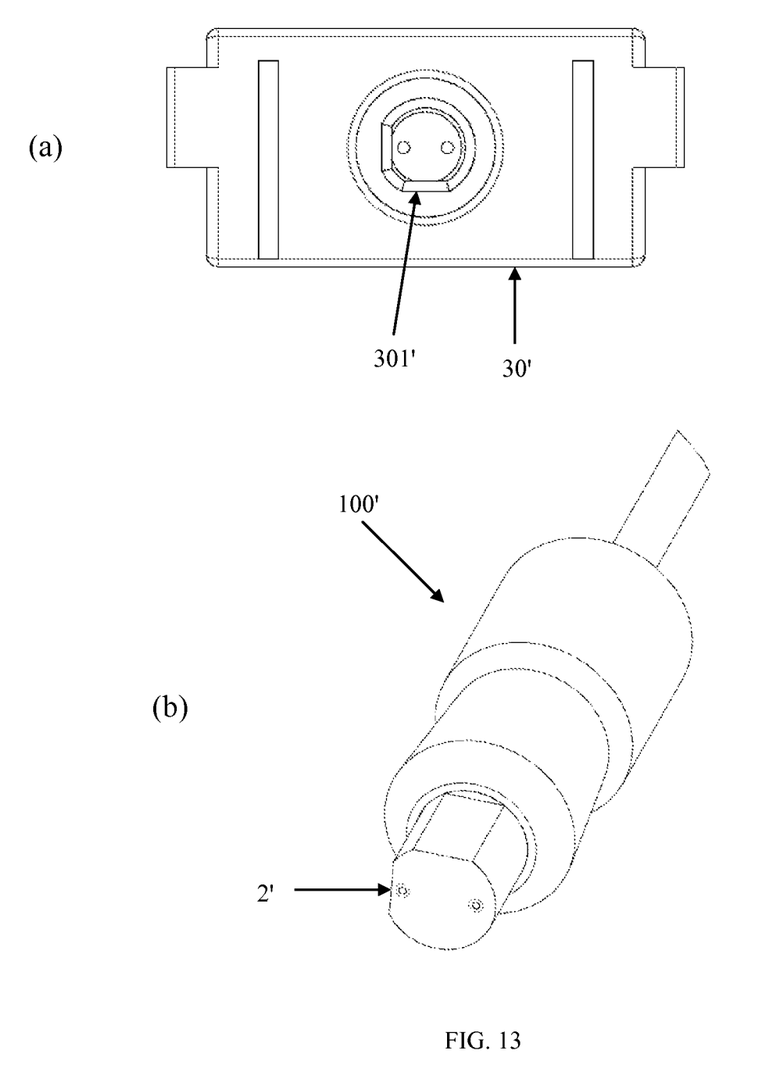
FIG. 13(a) is a front view of a lens cover plate with a receptacle according to another embodiment of the present application.
FIG. 13(b) is a perspective view of a plug with a fiber ferrule according to another embodiment of the present application for insertion into the receptacle of FIG. 13(a).

FIG. 13(a) is a front view of a cover plate 30' with a receptacle 301' according to another embodiment of the present application. FIG. 13(b) is a perspective view of a plug 100' with a fiber ferrule 2' according to another embodiment of the present application for insertion into the receptacle 301' of FIG. 13(a). It can be seen that the fiber ferrule 2' has two planar sidewalls that are adapted to mate with two planar sidewalls formed on the receptacle 301'.

While the active optical connector disclosed in the present application has been shown and described with particular references to a number of preferred embodiments thereof, it should be noted that various other changes or modifications may be made without departing from the scope of the appending claims.

What is claimed is:

1. An active optical connector using an audio port of an electronic device, the connector comprising:
    (a) a plug having a longitudinally extending central through-bore;
    (b) a conductor mounted on the plug;
    (c) first and second optical fibers extending through the central through-bore and having first and second front ends held in a fiber ferrule for receiving and emitting optical signals respectively therethrough;
    (d) a jack having a housing with a front opening;
    (e) a terminal mounted in the housing and configured to make contact with the conductor on the plug when the plug is fully inserted into the housing through the front opening thereof;
    (f) an optical transceiver module mounted at a rear open end of the housing, the optical transceiver module comprising a receptacle for receiving the fiber ferrule;
    (g) a light source provided on the optical transceiver module for emitting light towards the first front end of the first optical fiber;
    (h) a photo-detector provided on the optical transceiver module for receiving light from the second front end of the second optical fiber; and
    (i) a controller chip connected to the light source and the photo-detector, and comprising a converting circuit configured to convert electrical signals into optical signal and optical signals into electrical signals.

2. The connector as claimed in claim 1, wherein the plug is provided with a key configured to be insertable into a mating keyway formed at the front opening of the housing to guide the insertion of the plug into the jack.

3. The connector as claimed in claim 1, wherein the fiber ferrule is provided with a keyway configured to receive therein a mating key formed in the receptacle.

4. A plug for insertion into a jack, the plug comprising:
   (a) a body having a longitudinally extending central through-bore;
   (b) a conductor mounted on the body and configured to make contact with a corresponding terminal provided in the jack when the plug is fully inserted therein; and
   (c) first and second optical fibers extending through the central through-bore for receiving and emitting optical signals respectively therethrough, and having first and second front ends respectively held in a fiber ferrule for insertion into a receptacle formed on an optical transceiver module of the jack when the plug is fully inserted into the jack.

5. The plug as claimed in claim 4, comprising a protective tube for receiving therein the first and second optical fibers.

6. The plug as claimed in claim 4, comprising a window attached to a front face of the fiber ferrule.

7. The plug as claimed in claim 4, comprising:
   a first conductor comprising:
   (a) a front metal tip provided at a front portion of the plug for making contact with a first metal contact in the jack;
   (b) a first metal ring connected to and mounted within a central through-hole of the front metal tip;
   (c) a first metal tube having a front end connected to the first metal ring; and
   (d) a first terminal connected to a rear end of the first metal tube;
   a second conductor comprising:
   (e) a second metal ring mounted at a middle portion of the plug for making contact with a second metal contact in the jack;
   (f) a second metal tube having a front end connected to the second metal ring; and
   (g) a second terminal connected to a rear end of the second metal tube.

8. The plug as claimed in claim 7, comprising
   a first insulating ring mounted between the first and second metal rings; and
   a plastic separator mounted between a first flange extending radially outwardly from the rear end of the first metal tube and a second flange extending radially outwardly from the rear end of the second metal tube.

9. The plug as claimed in claim 7, comprising:
   (a) a third conductor comprising a first semi-cylindrical metal member mounted at a rear portion of the plug for making contact with a first semi-circular metal contact in the jack, and a third terminal connected to the first semi-cylindrical metal member; and
   (b) a fourth conductor comprising a second semi-cylindrical metal member mounted at a rear portion of the plug for making contact with a second semi-circular metal contact in the jack, and a fourth terminal connected to the second semi-cylindrical metal member, wherein the first and second semi-cylindrical metal members form a substantially cylindrical metal member.

10. The plug as claimed in claim 9, comprising a second insulating ring mounted between the second metal ring and the cylindrical metal member.

11. The plug as claimed in claim 9, comprising an insulating guard mounted between the third and fourth semi-cylindrical metal members, wherein the insulating guard comprises first and second axially extending cylindrical-shaped projections formed on two opposite sides thereof for slidably coupling with first and second axially extending cylindrical-shaped grooves formed on the first and second semi-cylindrical metal members respectively.

12. A jack for the insertion of a plug therein, the jack comprising:
   (a) a housing having a front opening through which the plug is insertable;
   (b) a metal contact mounted in the housing and configured to make contact with a corresponding conductor on the plug when the plug is fully inserted into the jack;
   (c) an optical transceiver module mounted at a rear open end of the housing, the optical transceiver module comprising a receptacle for receiving therein a fiber ferrule that holds first and second front ends of first and second optical fibers received in a central through-hole of the plug;
   (d) a light source provided on the optical transceiver module for emitting light towards the first front end of the first optical fiber;
   (e) a photo-detector provided on the optical transceiver module for receiving light from the second front end of the second optical fiber; and
   (f) a controller chip connected to the light source and the photo-detector, and comprising a converting circuit configured to convert electrical signals into optical signal and optical signals into electrical signals.

13. The jack as claimed in claim 12, wherein the optical transceiver module comprises a light source driver and a photo-detector signal amplifier.

14. The jack as claimed in claim 12, wherein the light source is selected from the group consisting of a light-emitting diode and a laser; and the photo-detector comprises a photodiode.

15. The jack as claimed in claim 12, further comprising a spring provided between a rear end of the optical transceiver module and a module holder for absorbing the load from the plug and maintaining a tight connection between the plug and the jack.

16. The jack as claimed in claim 12, comprising first and second semi-circular metal contacts for making contact with first and second semi-cylindrical metal contacts provided on the plug respectively.

17. The jack as claimed in claim 12, wherein the optical transceiver module further comprises a first lens disposed between the light source and the first front end of the first optical fiber along a first optical axis, and a second lens disposed between the photo-detector and the second front end of the second optical fiber along a second optical axis.

18. The jack as claimed in claim 17, wherein the receptacle and the first and second lenses are formed on a lens cover plate disposed perpendicular to the first and second optical axes.

19. The jack as claimed in claim 18, wherein the light source, the photo-detector and the controller chip are mounted on a substrate fixed to the lens cover plate.

20. The jack as claimed in claim 19, wherein the optical transceiver module comprises a flexible circuit connector connecting the controller chip to a circuit board of an external electronic device.

* * * * *